US007139427B2

(12) United States Patent
Kim

(10) Patent No.: US 7,139,427 B2
(45) Date of Patent: Nov. 21, 2006

(54) METHOD FOR DETECTING PATTERN-LIKE IMAGES AND METHOD FOR ENHANCING IMAGES WHILE SUPPRESSING UNDESIRABLE ARTIFACTS CAUSED BY PATTERN-LIKE IMAGES

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 705 days.

(21) Appl. No.: 10/359,840

(22) Filed: Feb. 7, 2003

(65) Prior Publication Data

US 2004/0156545 A1 Aug. 12, 2004

(51) Int. Cl.
*G06K 9/00* (2006.01)

(52) U.S. Cl. ...................................... 382/170; 382/254

(58) Field of Classification Search ................ 382/168, 382/170, 275, 254
See application file for complete search history.

(56) References Cited

U.S. PATENT DOCUMENTS 6,389,177 B1 * 5/2002 Chu et al. .................. 382/268
6,901,165 B1 * 5/2005 Egger et al. ................ 382/170
6,990,219 B1 * 1/2006 Morimura et al. .......... 382/125

* cited by examiner

*Primary Examiner*—Phuoc Tran
(74) *Attorney, Agent, or Firm*—Kenneth L. Sherman, Esq.; Michael Zarrabian, Esq.; Myers Dawes Andras & Sherman, LLP

(57) ABSTRACT

When enhancing an input image consisting of a pattern-like image, unnatural and undesirable artifacts arise as a side effect. A method for detecting a pattern-like image includes steps of: obtaining a histogram h[x] of an input image; dividing the histogram h[x] into at least a first subset of samples and a second subset of samples; and determining whether the input image is a pattern-like image based on a relationship between a number $n_1$ of samples in the first subset of samples and a number $n_2$ of samples in the second subset of samples. The relationship can be incorporated into an equation for calculating a pattern-like image detection parameter r and this pattern-like image detection parameter r can be used to adaptively adjust the output of a video enhancement system so that the side effect can be avoided when a pattern-like image comes in.

15 Claims, 4 Drawing Sheets

OBTAIN A HISTOGRAM $h[x]$ OF AN INPUT IMAGE — STEP 1

DIVIDE THE HISTOGRAM $h[x]$ INTO AT LEAST A FIRST SUBSET OF SAMPLES AND A SECOND SUBSET OF SAMPLES — STEP 2

CALCULATE A NUMBER $n_1$ OF SAMPLES IN THE FIRST SUBSET OF SAMPLES USING $n_1 = \sum_{x \in P_1} h[x]$;
CALCULATE A NUMBER $n_2$ OF SAMPLES IN THE SECOND SUBSET OF SAMPLES USING $n_2 = \sum_{x \in P_2} h[x]$; and
DETERMINE WHETHER THE INPUT IMAGE IS A PATTERN-LIKE IMAGE USING $r = \min(1.0, \frac{n_1}{n_2} \cdot \frac{1}{\Delta})$, WHERE $\Delta$ IS A PREDETERMINED CONSTANT — STEP 3

CONCLUDE THAT THE INPUT IMAGE IS A PATTERN-LIKE IMAGE AS THE PATTERN-LIKE IMAGE DETECTION PARAMETER $r$ APPROACHES ONE; AND CONCLUDE THAT THE INPUT IMAGE IS NOT A PATTERN-LIKE IMAGE AS THE PATTERN-LIKE IMAGE DETECTION PARAMETER $r$ APPROACHES ZERO — STEP 4

METHOD FOR DETECTING PATTERN-LIKE IMAGES AND METHOD FOR ENHANCING IMAGES WHILE SUPPRESSING UNDESIRABLE ARTIFACTS CAUSED BY PATTERN-LIKE IMAGES

BACKGROUND OF THE INVENTION

Field of the Invention

The present invention relates to the field of video signal processing. More specifically, the present invention relates to a method for detecting a pattern-like image. As a result of detecting a pattern-like image, unnatural and undesirable artifacts, which arise as a side effect of performing video enhancement based on the statistics of a given video signal, can be prevented. With this in mind, the present invention also relates to a method for enhancing images while suppressing the undesirable artifacts that would otherwise be caused by pattern-like images. In an exemplary embodiment of the invention, a pattern-like image detection parameter r is calculated and is then used to adaptively adjust the output of a video enhancement system so that the side effect can be avoided when a pattern-like image comes in. Examples of applications of the present invention include, but are not limited to, contrast enhancement and color enhancement, which are based on image characteristics and are usually used for normal images (not pattern-like images). Many people working on video enhancement systems have experienced the fact that a typical enhancement method will introduce unwanted or undesirable results for particular pattern images that are somewhat different from normal video images. An example of a pattern-like image is shown in FIG. 1.

SUMMARY OF THE INVENTION

It is accordingly an object of the invention to provide a method for detecting a pattern-like image and a method for suppressing undesired artifacts caused by enhancing an input image with a pattern-like image.

With the foregoing and other objects in view there is provided, in accordance with the invention, a method for detecting a pattern-like image that includes steps of: obtaining a histogram h[x] of an input image; dividing the histogram h[x] into at least a first subset of samples and a second subset of samples; and determining whether the input image is a pattern-like image based on a relationship between a number $n_1$ of samples in the first subset of samples and a number $n_2$ of samples in the second subset of samples.

In accordance with an added feature of the invention, the determining step includes calculating a pattern-like image detection parameter r based on a ratio between the number $n_1$ of samples in the first subset of samples and the number $n_2$ of samples in the second subset of samples.

In accordance with an additional feature of the invention, the determining step includes: calculating the number $n_1$ of samples in the first subset of samples using $$n_1 = \sum_{x \in P_1} h[x];$$

and calculating the number $n_2$ of samples in the second subset of samples using $$n_2 = \sum_{x \in P_2} h[x].$$

In accordance with another feature of the invention, the pattern-like image detection parameter r is calculated using $$r = \min\left(1.0, \frac{n_1}{n_2} \cdot \frac{1}{\Delta}\right),$$

and Δ is a predetermined constant.

In accordance with a further feature of the invention, the determining step includes concluding that the input image is a pattern-like image as the pattern-like image detection parameter r approaches one.

In accordance with a further added feature of the invention, the determining step includes concluding that the input image is not a pattern-like image as the pattern-like image detection parameter r approaches zero.

With the foregoing and other objects in view there is also provided, in accordance with the invention, a method for suppressing undesirable artifacts arising from enhancing an input image f. This method includes steps of: obtaining a histogram h[x] of the input image f; dividing the histogram h[x] into at least a first subset of samples and a second subset of samples; calculating a pattern-like image detection parameter r using a relationship between a number $n_1$ of samples in the first subset of samples and a number $n_2$ of samples in the second subset of samples; obtaining an enhanced image e by performing an enhancement method on the input image f; and outputting an adjusted image g obtained using $g=r \cdot f+(1-r) \cdot e$.

In accordance with an added feature of the invention, the calculating step includes: calculating the number $n_1$ of samples in the first subset of samples using $$n_1 = \sum_{x \in P_1} h[x];$$

and calculating the number $n_2$ of samples in the second subset of samples using $$n_2 = \sum_{x \in P_2} h[x].$$

In accordance with an additional feature of the invention, the calculating step includes using a ratio between the number $n_1$ of samples in the first subset of samples and the number $n_2$ of samples in the second subset of samples.

With the foregoing and other objects in view there is also provided, in accordance with the invention, a method for suppressing undesirable artifacts arising from enhancing an input image f. This method includes steps of: obtaining a histogram h[x] of the input image f; dividing the histogram h[x] into at least a first subset of samples and a second subset of samples; calculating a pattern-like image detection parameter r using a relationship between a number $n_1$ of samples in the first subset of samples and a number $n_2$ of samples in the second subset of samples; obtaining an enhanced image e by performing an enhancement method on the input image f; and outputting an adjusted image g obtained as a function of the enhanced image e, the input image f, and the pattern-like image detection parameter r.

DESCRIPTION OF THE PREFERRED EMBODIMENTS

Let h[x] denote the histogram of an input picture (field or frame) f composed of J pixels where x denotes a gradation level. Note that the histogram of an image represents the number of pixels that have a specific gradation level x as a function of x, where x varies from 0 (black) to L (white). Since the upper gradation level L equals 255 in a typical video system, in the description of the exemplary embodiments of the invention, it will be assumed that $x \in \{1, 2, \ldots, 255\}$.

Based on the histogram of an input image, the set of input gradation levels, which is $\{1, 2, \ldots, 255\}$, is clustered into two subsets $P_1$ and $P_2$, where:

$$P_1=\{x|h[x]>K \forall x \in \{0, 1, \ldots, 255\}\}; \quad (1)$$

and $$P_2=\{x|h[x] \leqq K \forall x \in \{0, 1, \ldots, 255\}\}. \quad (2)$$

In this case $$K\left(0 \le K \le \sum_{x=0}^{255} h[x]\right)$$

is a predetermined constant. Note that $P_1 \cup P_2=\{0, 1, \ldots, 255\}$.

The first subset $P_1$ given in (1) is the set of gradation levels whose histogram values are greater than K, whereas the second subset $P_2$ given in (2) is the set of gradation levels whose histogram values are less than or equal to K. For instance, suppose that we have:

h[0]=h[1]=500;

h[2]=h[3]=. . . =h[253]=10,000; and h[254]=h[255]=1,220.

If we take K=3000, then the two subsets that are obtained are:

$P_1=\{2, 3, \ldots, 253\}$ and $P_2=\{0,1,254,255\}$.

Figure 1:
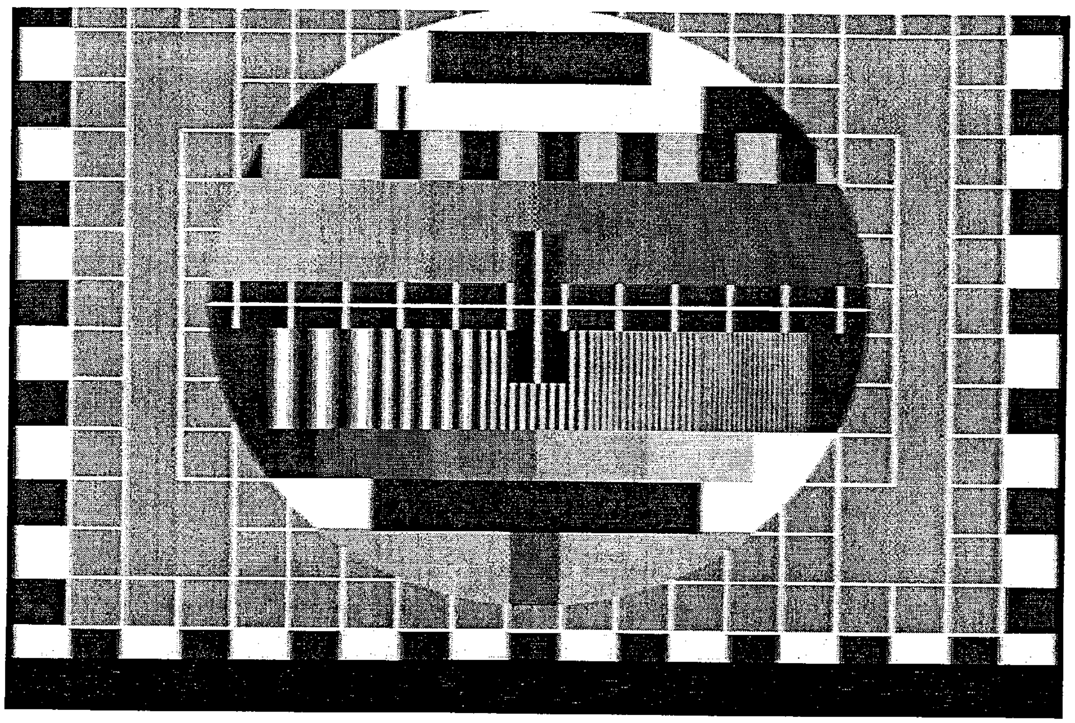
FIG. 1 shows an example of a pattern-like image.
Figure 2:
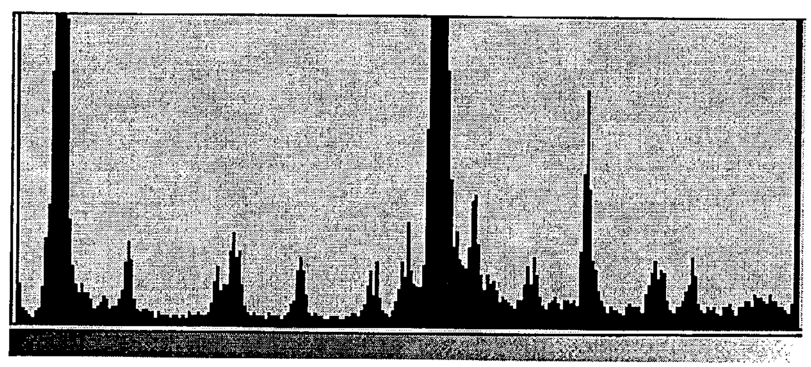
FIG. 2 is a histogram of a pattern-like image.

The notion behind computing the two subsets $P_1$ and $P_2$ is to distinguish the gradation levels that have relatively large histogram values (or a large distribution), since the histogram of a pattern-like signal will have large histogram values at certain gradation levels. FIG. 2 is a histogram of a pattern-like image that exhibits large histogram values at certain gradation levels.

Based on the clustering, the following two parameters are computed:

$$n_1 = \sum_{x \in P_1} h[x]; \quad (3)$$

and $$n_2 = \sum_{x \in P_2} h[x]. \quad (4)$$

Here, $n_1$ represents the total number of samples whose respective histogram values are greater than K and $n_2$ represents the total number of samples whose respective histogram values are less than or equal to K. Note that it is more likely that the input picture is a pattern-like image as the value of $n_1$ becomes relatively large compared to $n_2$. With this in mind, we will define a pattern-like image detection parameter r that will provide an indication of whether the value of $n_1$ is relatively large compared to $n_2$, or in other words whether there is a large number of histogram values in subset $P_1$ as compared to subset $P_2$.

It should now be apparent to one of ordinary skill in the art that numerous equations could be used to calculate the pattern-like image detection parameter r, and the invention should not be construed as being limited to incorporating any one particular equation. All that is important is that the pattern-like image detection parameter r be based on an equation using some relationship between $n_1$ and $n_2$ to provide an indication of whether the value of $n_1$ is relatively large compared to $n_2$. For example, an equation incorporating a ratio between $n_1$ and $n_2$ would probably be best, however, an equation using a difference between the two values could also be used. It should also be understood that the invention could alternatively be practiced by determining whether the value $n_2$ is relatively large as compared to the value of $n_1$. Additionally, it is also conceivable to cluster the histogram of the input image into more than two subsets and to determine whether there are a large number of gradation levels in one of the subsets as compared to at least one of the other subsets.

As an example of an equation incorporating a ratio, we define the pattern-like image detection parameter r as:

$$r = \min\left(1.0, \frac{n_1}{n_2} \cdot \frac{1}{\Delta}\right), \quad (5)$$

where Δ is a predetermined constant. Note that:

$$r=1 \text{ if } n_1 \geqq \Delta \cdot n_2.$$

One can conclude that the input image is most likely a pattern-like image as the value of the pattern-like image detection parameter r approaches 1 and that the input image is most likely a normal image as the value of the pattern-like image detection parameter r approaches 0.

Figure 3:
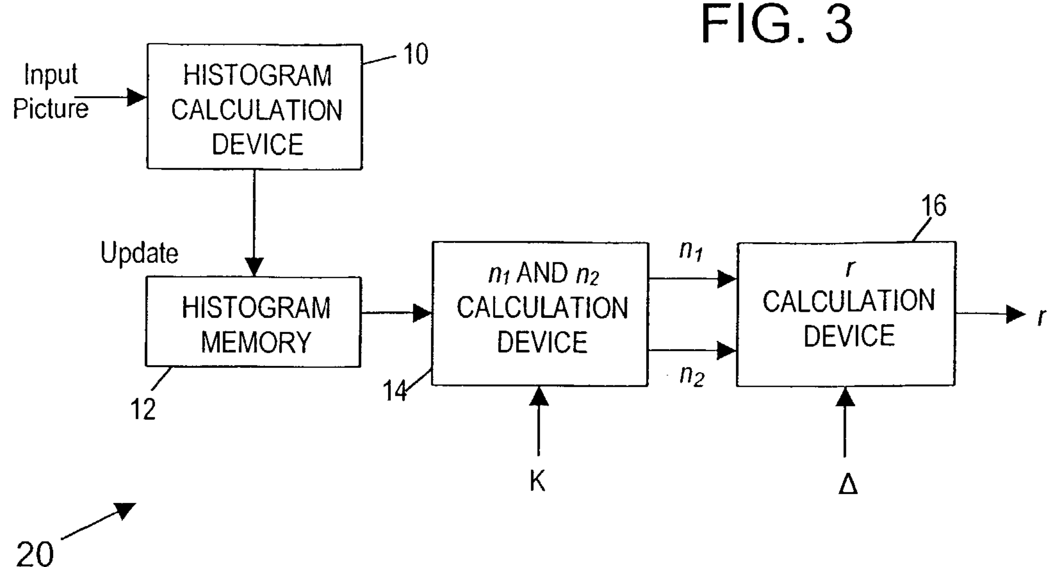
FIG. 3 is a block diagram of an exemplary embodiment of an apparatus for detecting a pattern-like image.

FIG. 3 is a block diagram of an exemplary embodiment of an apparatus 20 for detecting a pattern-like image. For the incoming video or image input, a histogram of one frame f of the picture is determined by the histogram calculation device 10 and is stored in the histogram memory 12. Updating of the histogram memory 12 can be synchronized with the input frame f. Then, the $n_1$ and $n_2$ calculation device 14 computes the value of $n_1$ and $n_2$ according to equations (1)–(4), and finally the pattern-like image detection parameter r calculating device 16 computes the pattern-like image detection parameter r using equation (5).

Figure 4:
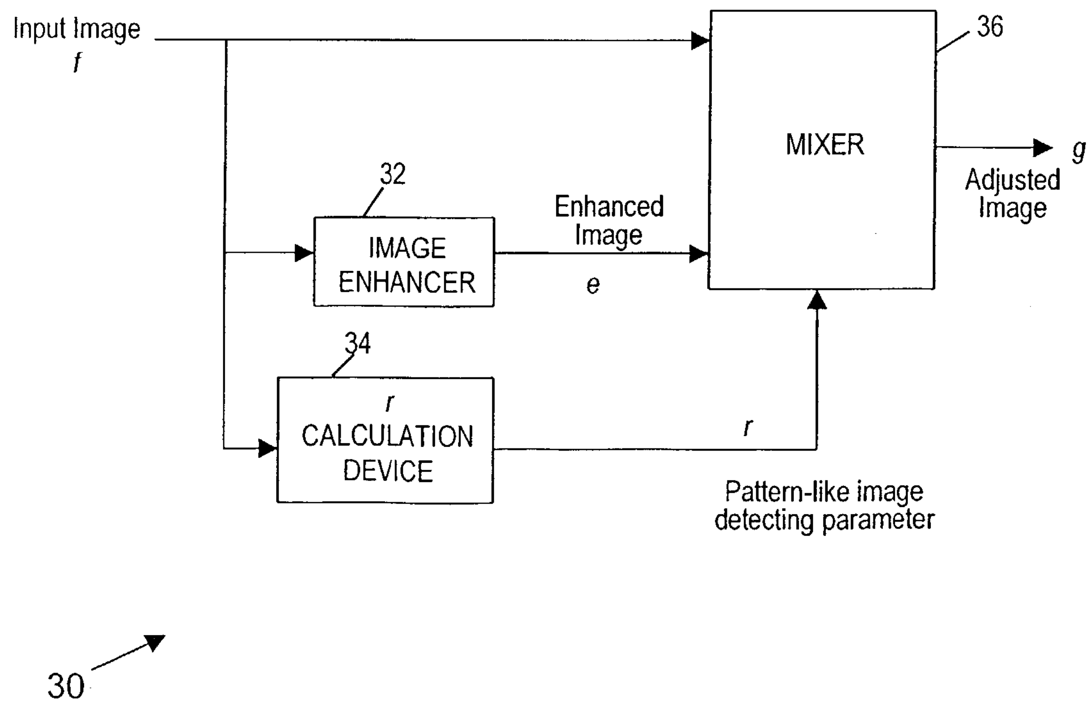
FIG. 4 is a block diagram of an exemplary embodiment of an image enhancement system.

There are many possible ways of utilizing the pattern-like image detection parameter r in different types of image enhancement systems. FIG. 4 is a block diagram of an exemplary embodiment of such an image enhancement system. In FIG. 4, f is an input image and e is an enhanced image that is obtained from an image enhancer 32 constructed for performing a particular enhancement method. The enhancement method can be any one of a number of known enhancement methods and will therefore not be described in detail in this disclosure.

The adjusted image g is an enhanced image that is dependent upon or is a function of the pattern-like image detection parameter r, the enhanced image e, and the input image f. The important aspect is that the enhancement be minimized or eliminated as it becomes more likely that the input image f is a pattern-like image. It should now be apparent that many different equations could satisfy the requirement and could therefore be used to obtain the adjusted image g. In this exemplary embodiment, the adjusted image g is obtained by using a mixer 36 to mix the input image f and the enhanced image e according to equation (6):

$$g=r\cdot f+(1-r)\cdot e. \tag{6}$$

Note that if the pattern-like image detection parameter r obtained from the pattern-like image detection parameter r calculation device 34 equals zero, i.e. a normal input image, then the adjusted image g is the enhanced image e that is provided by the image enhancer 32. Also note that if the pattern-like image detection parameter r equals one (r=1), i.e. a pattern-like image, then the adjusted image g is the original input image f and no enhancement is obtained.

Figure 5:
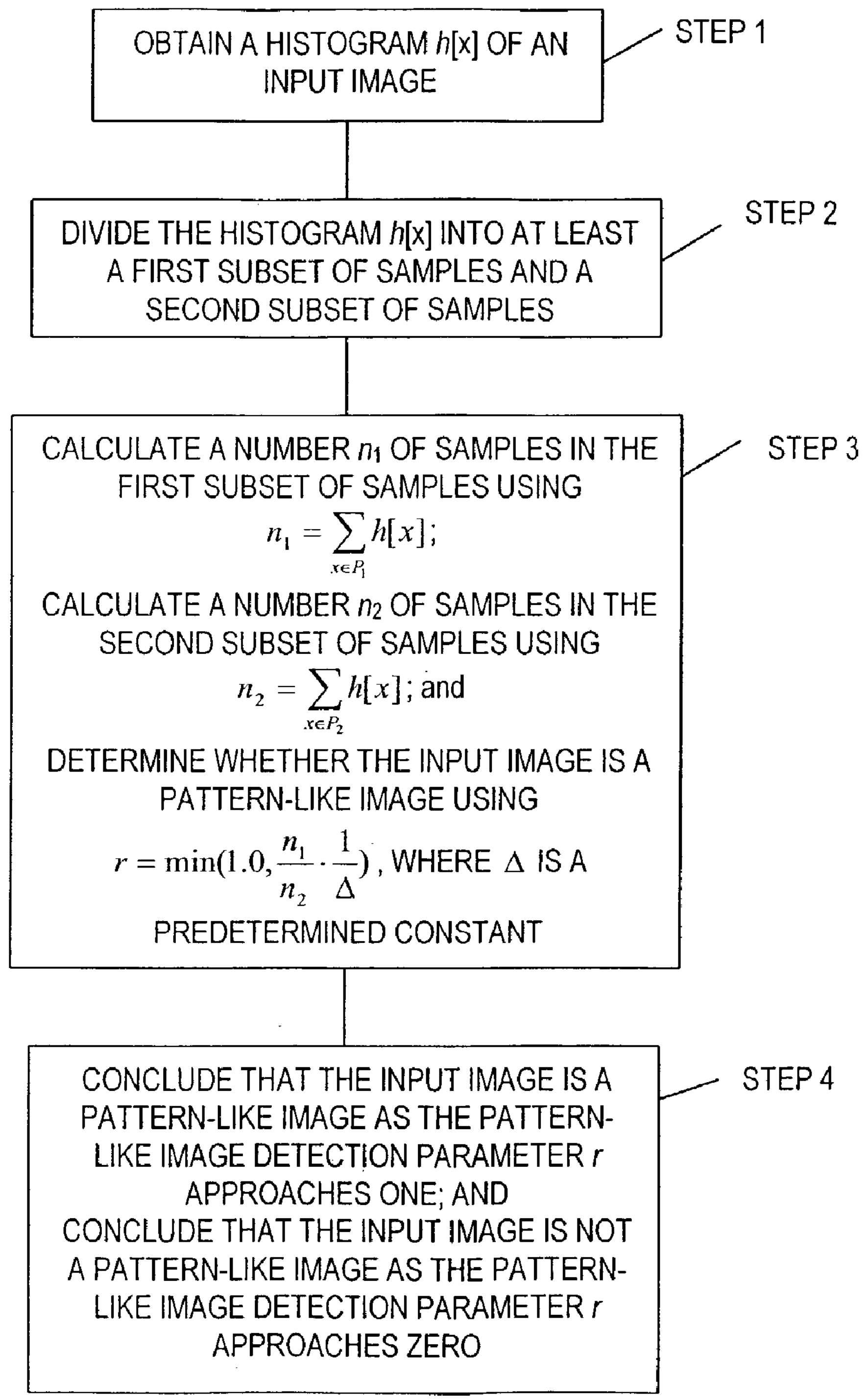
FIG. 5 is a flowchart summarizing the steps of a method for detecting a pattern-like image.

FIG. 5 is a flowchart summarizing the steps involved in performing an exemplary embodiment of the method for detecting a pattern-like image. Step 1 includes obtaining a histogram h[x] of an input image, and step 2 includes dividing the histogram h[x] into at least a first subset $P_1$ of samples and a second subset $P_2$ of samples using equations (1) and (2) and a suitable value of K. Step 3 includes determining whether the input image is a pattern-like image based on a relationship between a number $n_1$ of samples in the first subset of samples and a number $n_2$ of samples in the second subset of samples. In the exemplary embodiment shown in FIG. 5, step 3 is implemented by calculating the number $n_1$ of samples in the first subset of samples and calculating the number $n_2$ of samples in the second subset of samples using equations (3)–(4). In the exemplary embodiment shown in FIG. 5, step 3 also includes calculating the pattern-like image detection parameter r using equation (5), however, as previously discussed other suitable equations could alternatively be used. When using equation (5), one can conclude that the input image is a pattern-like image as the pattern-like image detection parameter r approaches one, and one can conclude that the input image is not a pattern-like image as the pattern-like image detection parameter r approaches zero.

Figure 6:
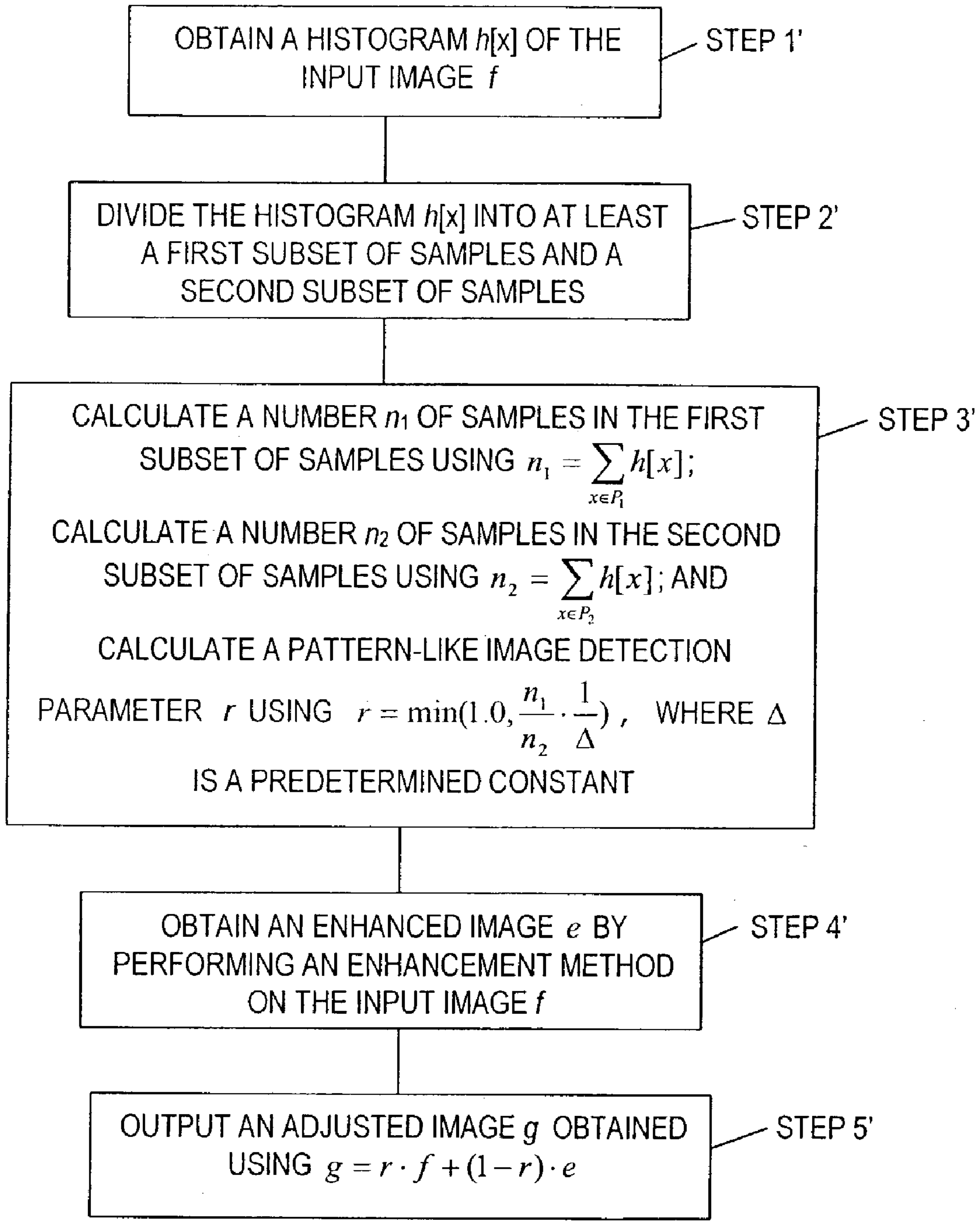
FIG. 6 is a flow chart summarizing the steps of a method for suppressing undesirable artifacts arising from enhancing an input image f.

FIG. 6 is a flowchart summarizing the steps involved in performing an exemplary embodiment of the method for suppressing undesirable artifacts arising from enhancing an input image f. Steps 1' and 2' are identical to steps 1 and 2 described with regard to FIG. 5. Step 1' includes obtaining a histogram h[x] of the input image f. Step 2' includes dividing the histogram h[x] into at least a first subset of samples and a second subset of samples. This is done, for example, using the parameter K and equations (1) and (2). In the exemplary embodiment shown in FIG. 5, step 3' is implemented by calculating a pattern-like image detection parameter r using a relationship between a number $n_1$ of samples in the first subset of samples and a number $n_2$ of samples in the second subset of samples. The number $n_1$ of samples in the first subset of samples and the number $n_2$ of samples in the second subset of samples are obtained using equations (3) and (4).

The pattern-like image detection parameter r is calculated using equation (5), however, as previously discussed, equation (5) is merely given as an example, and other similar equations could likewise be used. Step 4' includes obtaining an enhanced image e by performing an enhancement method on the input image f. The enhancement method can be any one of a number of known enhancement methods. Step 5' includes outputting an adjusted image g obtained using $g=r\cdot f+(1-r)\cdot e$.

I claim:

1. A method for detecting a pattern-like image, which comprises:

obtaining a histogram h[x] of an input image;

dividing the histogram h[x] into at least a first subset of samples and a second subset of samples; and determining whether the input image is a pattern-like image based on a relationship between a number $n_1$ of samples in the first subset of samples and a number $n_2$ of samples in the second subset of samples.

2. The method according to claim 1, wherein the determining step includes calculating a pattern-like image detection parameter r based on a ratio between the number $n_1$ of samples in the first subset of samples and the number $n_2$ of samples in the second subset of samples.

3. The method according to claim 2, wherein the determining step includes:

calculating the number $n_1$ of samples in the first subset of samples using $$n_1 = \sum_{x\in P_1} h[x];$$

and calculating the number $n_2$ of samples in the second subset of samples using $$n_2 = \sum_{x\in P_2} h[x],$$

where $P_1$ is the first subset of samples and $P_2$ is the second subset of samples.

4. The method according to claim 3, wherein the pattern-like image detection parameter r is calculated using $$r = \min\left(1.0,\ \frac{n_1}{n_2} \cdot \frac{1}{\Delta}\right),$$

and Δ is a predetermined constant.

5. The method according to claim 2, wherein the pattern-like image detection parameter r is calculated using $$r = \min\left(1.0,\ \frac{n_1}{n_2} \cdot \frac{1}{\Delta}\right),$$

and Δ is a predetermined constant.

6. The method according to claim 5, wherein the determining step includes concluding that the input image is a pattern-like image as the pattern-like image detection parameter r approaches one.

7. The method according to claim 5, wherein the determining step includes concluding that the input image is not a pattern-like image as the pattern-like image detection parameter r approaches zero.

8. A method for suppressing undesirable artifacts arising from enhancing an input image f, the method which comprises:

obtaining a histogram h[x] of the input image f;

dividing the histogram h[x] into at least a first subset of samples and a second subset of samples;

calculating a pattern-like image detection parameter r using a relationship between a number $n_1$ of samples in the first subset of samples and a number $n_2$ of samples in the second subset of samples;

obtaining an enhanced image e by performing an enhancement method on the input image f; and outputting an adjusted image g obtained using $g=r \cdot f+(1-r) \cdot e$.

9. The method according to claim 8, wherein the pattern-like image detection parameter r is calculated using $$r = \min\left(1.0,\ \frac{n_1}{n_2} \cdot \frac{1}{\Delta}\right),$$

and Δ is a predetermined constant.

10. The method according to claim 9, wherein the calculating step includes:

calculating the number $n_1$ of samples in the first subset of samples using $$n_1 = \sum_{x \in P_1} h[x];$$

and calculating the number $n_2$ of samples in the second subset of samples using $$n_2 = \sum_{x \in P_2} h[x],$$

where $P_1$ is the first subset of samples and $P_2$ is the second subset of samples.

11. The method according to claim 8, wherein the calculating step includes using a ratio between the number $n_1$ of samples in the first subset of samples and the number $n_2$ of samples in the second subset of samples.

12. A method for suppressing undesirable artifacts arising from enhancing an input image f, the method which comprises:

obtaining a histogram h[x] of the input image f;

dividing the histogram h[x] into at least a first subset of samples and a second subset of samples;

calculating a pattern-like image detection parameter r using a relationship between a number $n_1$ of samples in the first subset of samples and a number $n_2$ of samples in the second subset of samples;

obtaining an enhanced image e by performing an enhancement method on the input image f; and outputting an adjusted image g obtained as a function of the enhanced image e, the input image f, and the pattern-like image detection parameter r.

13. The method according to claim 12, wherein the pattern-like image detection parameter r is calculated using $$r = \min\left(1.0,\ \frac{n_1}{n_2} \cdot \frac{1}{\Delta}\right),$$

and Δ is a predetermined constant.

14. The method according to claim 13, wherein the calculating step includes:

calculating the number $n_1$ of samples in the first subset of samples using $$n_1 = \sum_{x \in P_1} h[x];$$

calculating the number $n_2$ of samples in the second subset of samples using $$n_2 = \sum_{x \in P_2} h[x],$$

where $P_1$ is the first subset of samples and $P_2$ is the second subset of samples.

15. The method according to claim 12, wherein the calculating step includes using a ratio between the number $n_1$ of samples in the first subset of samples and the number $n_2$ of samples in the second subset of samples.

* * * * *